(12) United States Patent
Millett (10) Patent No.: US 8,694,410 B1
(45) Date of Patent: Apr. 8, 2014

(54) SYSTEM FOR IDENTIFYING AND DISPLAYING EFFECTIVE SUPPORT AND RESISTANCE PRICE LEVELS FOR SECURITIES AND COMMODITIES AND METHODS OF USE

(76) Inventor: Martyn G. Millett, Louisville, CO (US)

( * ) Notice: Subject to any disclaimer, the term of this patent is extended or adjusted under 35 U.S.C. 154(b) by 909 days.

(21) Appl. No.: 12/755,168

(22) Filed: Apr. 6, 2010

Related U.S. Application Data (60) Provisional application No. 61/320,214, filed on Apr. 1, 2010.

(51) Int. Cl.
*G06Q 40/00* (2012.01)

(52) U.S. Cl.
USPC .............................. 705/37; 705/35; 705/36 R (58) Field of Classification Search
USPC ........................................... 705/35, 36 R, 37
See application file for complete search history.

(56) References Cited

U.S. PATENT DOCUMENTS

2005/0261999 A1* 11/2005 Rowady, Jr. .................... 705/35

OTHER PUBLICATIONS

Technical Analysis, Martin Sewell, Department of Computer Science, University College London, Apr. 2007 (revised Aug. 2008); 8 pages.*
Support and Resistance Simplified, Copyright © 2003 by Michael Thomsett., Published by Marketplace Books.*

* cited by examiner

*Primary Examiner* — Alexander Kalinowski
*Assistant Examiner* — Kellie Campbell
(74) *Attorney, Agent, or Firm* — Startup IP Law, LLC; Terrence M. Wyles, Esq.

(57) ABSTRACT

The disclosure is directed generally to a system used to generate and display useful support and resistance levels, as derived from a given price of a security or commodity. The system incorporates a methodology to derive and display key price values, in actual currency units such as dollars and cents, to serve as support and resistance levels for the benefit of a user who in turn can better make buy and sell decisions for targeted securities and/or commodities.

20 Claims, 5 Drawing Sheets

Elliott Basic Wave Pattern

Fig. 1

Nested Fractals Within an Elliott Basic Wave Pattern

Fig. 2

Nominal Q-Based Wave Pattern

Table 1. Qscale from 4 to -6
Qlevel Placements for 11/27/2009

GLDI 1173.46 5
1159.78 4
1146.26 8
1132.89 4
1119.69 5
1106.63 4
ES SPY 1093.73 6
1080.98 4
SPX 1068.38 5
1055.93 4
1043.62 7
1031.45 4
1019.42 5
1007.54 4
DJ 995.79 6
984.19 4
972.71 5
961.37 4
950.16 10

SYSTEM FOR IDENTIFYING AND DISPLAYING EFFECTIVE SUPPORT AND RESISTANCE PRICE LEVELS FOR SECURITIES AND COMMODITIES AND METHODS OF USE

CROSS-REFERENCE TO RELATED APPLICATIONS

This patent application claims the benefit of U.S. Patent Application No. 61/320,214, filed on Apr. 1, 2010, which is hereby incorporated by reference for all purposes.

BACKGROUND OF THE INVENTION

Many believe that the behavior of economic and financial systems should be viewed like almost any other system of nature in that they can be tracked to follow relatively predictable mathematical patterns which can then be exploited by those who understand these natural phenomena. The problems historically with this approach is (1) one must actually identify and understand such natural patterns, and (2) once identified, the data of such patterns must be effectively marshalled such that an interested user (such as a trader in securities such as stocks, bonds, etc. or in commodities) can use the data with relative ease and effectiveness.

In the financial markets, many in the industry believe that trends in prices are more or less arrested or reversed at what are called support and resistance levels, which are to some degree predictable from the past behavior of the price series. Support and resistance levels (also sometimes called support and resistance lines) are a concept that virtually all traders are familiar with. See, for example, Osler, Carol, "Support for Resistance: Technical Analysis and Intraday Exchange Rates", Federal Reserve Bank of New York Economic Policy Review 6 (2), July 2000, pp 53-68 (" . . . [T]he vast majority of the daily technical reports include "support" and "resistance" levels."). Some support and resistance levels are a moving average, while others are based on previous high and low prices (e.g., the previous trading day's opening and closing prices), or derivations of high and low prices. A brief explanation of support and resistance levels follows below.

"Support levels" are prices that become more difficult for the current price to go below as trading patterns develop above them, further defining the particular price or area in price as time goes by. Traders want to identify these areas of price as soon as possible. The obvious goal is to essentially identify the predicted "floor" for the price of a traded security or commodity, relative to a current trading price, such that the trader knows when a "buy" order should be made. To put it another way, an attempt is made to buy at the lowest possible price without risking that the trader waits too long until after the price is already consistently trending significantly back up above the support level.

Conversely, "resistance levels" are the opposite of "support levels" in that it can be observed that a given starting price of a security can approach a price level which almost acts as a limit and is very difficult to go above. The obvious goal associated with identifying a given resistance level is to attempt to identify the point at which a trader should consider selling a given security or commodity in order to avoid a subsequent downward pricing trend (that is, "sell high").

It should be noted that both support and resistance levels relative to a given starting price are merely statistical guidelines, but are hardly hard limits on prices. When effectively identified, they can be tools for traders to mitigate risks. However, a price can nevertheless "break through" and go below a given support level, at which point the breached support level now becomes the new resistance level, and the price of the security or commodity in question will tend to continue to fall until a new support level is encountered. Likewise, a price can "break through" and exceed a resistance level, at which point the breach resistance level now becomes the new support level, and the price of the security or commodity will tend to continue to rise until a new resistance level is encountered.

Over the years, many have attempted to identify a valid pricing pattern that would facilitate the development of a system to provide useful "magic numbers" to traders and other consumers such that consistently prudent trading decisions are made. That is, what is desired is a system that can provide a prediction success rate of significantly over 50%. One measure of success is to track pricing levels for a given security or commodity and observe the "bounce frequency" at the prescribed support and resistance levels. Further, it is desired to have success rates that exceed those of systems that arbitrarily prescribe support and resistance levels, which Osler measured at around 56.2% (see Osler at 61).

Among those attempting to identify a pattern to pricing trends in support of a system to provide traders with useful support and resistance pricing levels relative to a trader-input pricing starting point, was W. D. Gann, a $20^{th}$ century market theorist, whose theories and economic philosophies incorporated "Gann angles" as he discussed in "The Basis of My Forecasting Method", published in 1935, which included methodologies that incorporated geometry, ancient mathematics, and even astrology. Gann devised a spiraling price chart based on his observation of number patterns that divided price into proportionate parts. Furthermore, Gann applied geometric squares to equate equal moves in time to equal moves in price. Opinions over the value and relevance of Gann's work are sharply divided.

Robert W. Colby, CMT, also wrote about some of Gann's work, including Gann's "Square of Nine" (see Colby, Robert W., "The Encyclopedia of Technical Market Indicators", 2nd Ed., McGraw-Hill, ISBN 0-07-012057-9, pp 287-288). Gann's "Square of Nine" attempts to relate a number of natural cycles, relationships, and structures to pricing behaviors, including those that appear in the Great Pyramid, Fibonacci spirals, various harmonic frequencies, the celestial and acoustic vibrations of Pythagoras, Galileo's Theorem of Equivalence and his concept of the solar system, and the equal tempered twelve-tone musical scale of Leonard Euler. Once again, the effectiveness of Gann's methods have been questioned within the industry.

Modern-day attempts to build on and improve on Gann's work include the work of T. H. Murrey, who developed a system called "Murrey Math". Murrey's solution, like Gann's, tries to employ various unorthodox techniques (e.g., numerology, alleged "hidden" values from Biblical scriptures), as well as seemingly arbitrary basis values such as birthdates or Mayan calendar dates. Consequently, the effectiveness of the software tools created by Murrey to implement his theories remains in question.

Another modern-day attempt to build upon Gann's use of Fibonacci sequences is dubbed "DanielCode", developed by John Needham. Once again, the goal of the DanielCode system seems to be to try and identify sets of support and resistance levels about a user-prescribed initial price point. However, this system relies on the alleged significance of supposedly historically and/or biblically significant numbers.

A more reliable and effective system for supplying technical indicators to aid in buy and sell decisions for securities and/or commodities is perpetually wished for in the trading industry. Such traders include:

- The "Fib" Confluence Trader, who uses Fibonocci extensions and projections based on previous important highs and lows (ranges) and their proportional key ratios (e.g., 0.382, 0.500, 0.618, 1.0, 1.618, 2.0, 2.236, etc.) in order to identify areas where there is a confluence of possible future levels that hopefully will help determine where turnarounds or possible target areas may occur.
- The "Pattern" Trader, who uses pattern recognition to determine when to enter or exit a trade. Patterns can be any of various configurations of previous price behaviors that seem to predict a likelihood of repeating the pattern once again. Among such patterns are "Cup and Handle", "Double Tops", "Rising Triple Tops", "Flag Patterns", "Parabolic", "Andrew Pitchforks", and "Trend" lines.
- The "Elliot Wave" Trader, who counts the progression of waves in the market to determine where likely turnarounds are to occur, based on wave theory.
- The "Trend Follower", who espouses the motto "the trend is your friend" and waits for a pullback when the market is trending higher to make his entry and do the opposite when the trend is down.
- The "Momentum Change" Trader uses indicators such as Moving Average Convergence and Divergence (MACD), where the momentum value indicator itself is based on a previous specific time period. Other various indicators are used, many of which are proprietary, that detect when a change in price momentum is occurring. As the previous high-momentum move in price wanes, the trader prepares for the inevitable change in direction that will occur.
- Traders of "Esoteric Methods", which include many of the prior-art examples discussed above, use horoscopes, planet alignments, moon cycles, Biblical references, Murrey Math, Gann harmonic Wheel Numbers, and such.
- The "Bond and Currency" Trader, as discussed in Olser, supra.

BRIEF DESCRIPTION OF THE DRAWINGS

FIG. 5 depicts one embodiment of a display of Q-levels within a relatively broad Q-scale. This example chart depicts one embodiment of a way to depict the relative power ratings for each displayed price.

DETAILED DESCRIPTION

Overview

The present inventive disclosure is directed generally to a system used to generate and display useful support and resistance levels, as a background information set for the current price of a security or commodity. The system incorporates a methodology to flexibly derive and display key price values, in specific currency units such as dollars and cents, to serve as support and resistance levels for the benefit of a user who in turn can better make buy and sell decisions for targeted securities and/or commodities.

In the 1930s, economist R. N. Elliott proposed that market prices unfold in specific patterns, which practitioners today call "Elliott Waves". Full expressions of Elliott's theories are in R. R. Prechter, *R. N. Elliott's Masterworks* (New Classics Library, 1994), ISBN 0932750370, pp 70, 194, 196, 217. Elliott argued that because humans are themselves rhythmical, the pattern of activities and decisions could be mapped and predictions derived therefrom.

Figure 1:
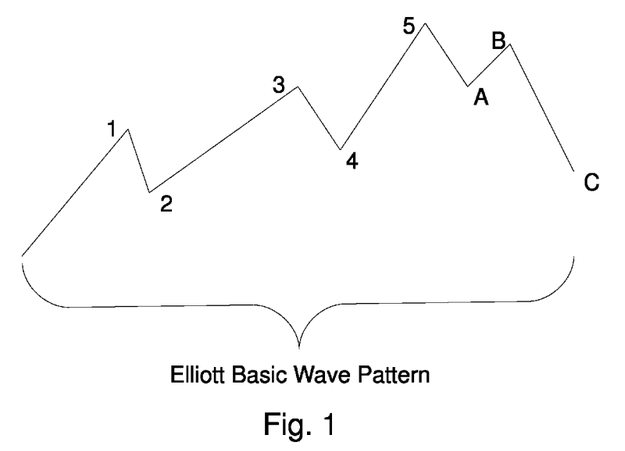
FIG. 1 depicts a typical example of an Elliott 5-3 "wave" pattern for trading behaviors by humans.
Figure 2:
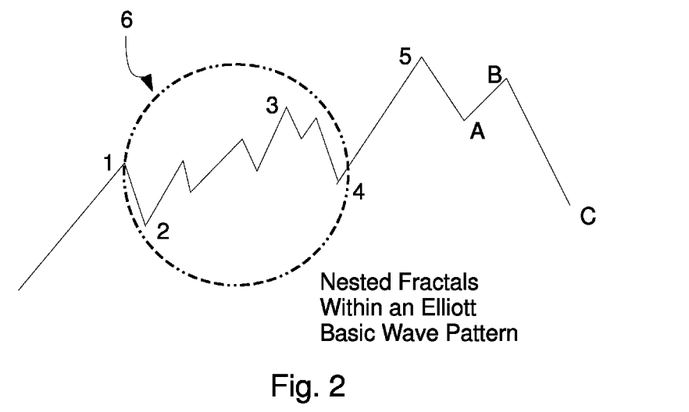
FIG. 2 depicts a nested Elliott 5-3 "wave" trading pattern within a larger Elliott 5-3 "wave" trading pattern.

Specifically, Elliott noted that fractal patterns of such human trading behaviors can be represented by a "five steps up, three steps back" (5-3) "wave" pattern as prices move over time. FIG. 1 depicts a typical such pattern, where the "five steps up" are denoted with numbers 1 through 5, and the "three steps back" are denoted by the designations of A through C. FIG. 2 reinforces this idea of the "wave" pattern wherein the region 6 between one of the sets of steps of FIG. 1 (points 2 and 4) forms a lesser-but-included version of the same basic 5-3 wave pattern; that is, a "fractal". The key is to figure out what value forms the basis of the trading-behavior fractal pattern relation between the sizes of the fractals.

Many physicists and mathematicians have observed expanding fractal patterns based on "the Golden Ratio", commonly referred to as "ϕ" (phi), in many systems of nature. Consequently, many in the trading industry have tried to impose the value of ϕ as the basis to pattern trading behaviors. The "Golden Ratio" (ϕ) is based on the various ratios between line segments that appear in a regular pentagram and can be expressed using the following calculation:

$$\varphi = \frac{1+\sqrt{5}}{2} \approx 1.618$$

The inventor was dissatisfied with the ability of the ϕ-based fractal patterns to accurately map human trading pattern boundaries and midpoints for analysis. The inventor discovered through extensive experimentation that price fractals become evident when the time element is removed and that the support and resistance levels sought by so many can be observed in pricing patterns based on a value that is an extension of ϕ, hereinafter called "Q", which is defined below. Notably, it can be observed that limits to price growths (or reductions) occur largely according to fractional separations associated with factors of Q. The reference to "Q" in terms pre-pended with "Q-", such as "Q-levels" and "Q-scales", refers to this naturally occurring base number derived, in part, from the "Golden Ratio" found in a regular pentagram:

$$Q = \varphi + \frac{1}{2} = \frac{\sqrt{5}}{2} + 1 \approx 2.118$$

Figure 3:
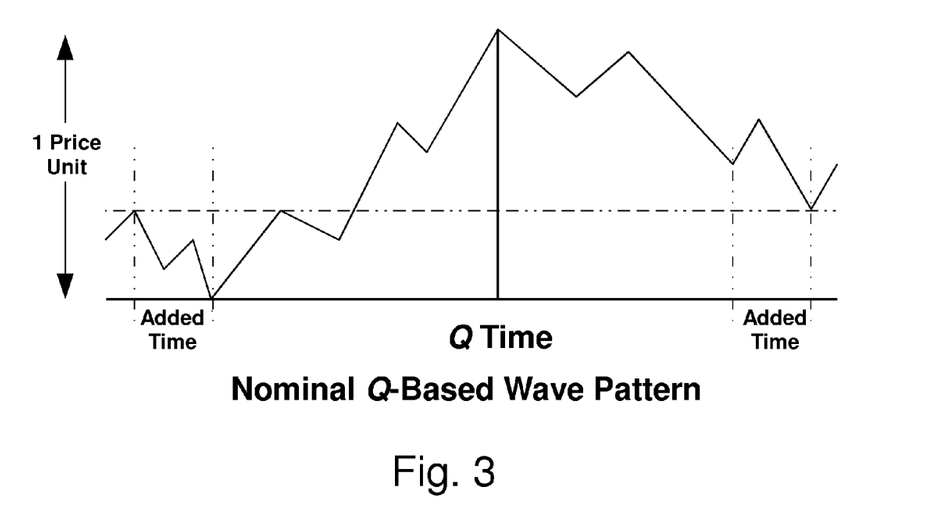
FIG. 3 depicts a nominal Q-based Wave Pattern, which is an extension of the traditional Elliott 5-3 wave pattern.

The value of Q is a logical extension of time for the basic ϕ-based 5-3 Elliott Wave Pattern, discussed supra. The inventor assigned the value of ϕ to the size of the pattern. Roughly speaking, the inventor extended out the Basic Elliott Wave Pattern in time by roughly ½ for extensive study. This resulted in what will be termed as a "Nominal Q-Based Wave Pattern" that better defines a mid point in pricing over the period of time. See FIG. 3. As a matter of fact, "Q" stands for "quartile" in recognition of this added fourth piece to the Elliott Basic Pattern. This observed additional fourth part of the pattern led to the finding of the repeated patterns based on the value of Q. Remarkably, the inventor observed that the length of the periods of the "waves" or fractals consistently tracks to some factor of Q, as do the high and low peak price values for a security or commodity in question. This being the case, the goal then became a matter of applying this observation of a natural pattern in a user-based system that can make some sense of the data, as well as direct users' attention toward the more "important" Q-based peak and valley prices.

In the system proposed by the present inventive disclosure, the provided support and resistance levels are referred to as "Q-levels", wherein each Q-level has an associated "power rating" displayed next to it to serve as an aid to a user to select the appropriate support and resistance levels from a range of displayed Q-level prices. The power ratings, which are discussed in detail later in this document, are a critical component to inform the system user as to which Q-level prices are more important than others within a given Q-scale (that is, displayed price range of interest).

All Q-levels are prices that equate to Q raised to some power. The power ratings used in conjunction with the Q-levels are partially a function of exponent from this formulation and are used somewhat similar to how seismic ratings are used to assign strength to earthquakes. The power rating of a Q-level denotes the relative strength or influence of one Q-level as compared to another. Use of the Q-levels gives the day trader, investor, or technical analyst a series of prices that can assist in trade decisions as price behavior is observed in relation to the levels. Unlike floor trader pivot points, and many other techniques, finding Q-levels does not rely on using previous highs and lows or other analysis of previous intermediate lines of support. Once a price has been "placed" on a range of all potential prices, said range being called the "Q-scale", all important Q-levels are dynamically determined from that point on. This feature distinguishes the use of Q-levels from other popular techniques such as moving averages, oscillators, stochastics, or trend lines because only the initial price is needed to seed the system to then facilitate the finding of technical indicators, that is, the Q-levels that represent the support and resistance levels. Significantly, the use of Q-levels, each of which includes a pairing of a Q-level price and an associated power rating, renders irrelevant the tracking of pricing trends over the passage of time to generate meaningful support and resistance levels.

TERMINOLOGY

The terms and phrases as indicated in quotes (" ") in this section are intended to have the meaning ascribed to them in this Terminology section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification and the appended claims, is not meant to be exclusive; rather, the term is inclusive, meaning "either or both".

References in the specification to "one embodiment", "an embodiment", "a preferred embodiment", "an alternative embodiment", "a variation", "one variation", "on implementation", "one implementation", and similar phrases mean that a particular feature, structure, or characteristic described in connection with the embodiment is included in at least an embodiment of the invention. The appearances of the phrase "in one embodiment" and/or "in one variation" in various places in the specification are not necessarily all meant to refer to the same embodiment.

The term "couple" or "coupled", as used in this specification and the appended claims, refers to either an indirect or a direct connection between the identified elements, components, or objects. Often the manner of the coupling will be related specifically to the manner in which the two coupled elements interact.

As applicable, the terms "about" or "generally" as used herein unless otherwise indicated means a margin of +−20%. Also, as applicable, the term "substantially" as used herein unless otherwise indicated means a margin of +−10%. It is to be appreciated that not all uses of the above terms are quantifiable such that the referenced ranges can be applied.

The term "security" generally refers to an investment instrument, other than an insurance policy or fixed annuity, issued by a corporation, government, or other organization which offers evidence of debt or equity. The official definition, from the Securities Exchange Act of 1934, and which is adopted by this patent application, is: "Any note, stock, treasury stock, bond, debenture, certificate of interest or participation in any profit-sharing agreement or in any oil, gas, or other mineral royalty or lease, any collateral trust certificate, pre-organization certificate or subscription, transferable share, investment contract, voting-trust certificate, certificate of deposit, for a security, any put, call, straddle, option, or privilege on any security, certificate of deposit, or group or index of securities (including any interest therein or based on the value thereof), or any put, call, straddle, option, or privilege entered into on a national securities exchange relating to foreign currency, or in general, any instrument commonly known as a 'security'; or any certificate of interest or participation in, temporary or interim certificate for, receipt for, or warrant or right to subscribe to or purchase, any of the foregoing; but shall not include currency or any note, draft, bill of exchange, or banker's acceptance which has a maturity at the time of issuance of not exceeding nine months, exclusive of days of grace, or any renewal thereof the maturity of which is likewise limited."

The term "commodity" refers to a physical substance, such as food, grains, and metals, which is interchangeable with another product of the same type, and which investors buy or sell, usually through futures contracts. More generally, a commodity is a product which trades on a commodity exchange. Such products include foreign currencies, financial instruments, and financial indexes.

The term "Q-level" generally is a portion of a pricing scale (a Q-scale) that tends to follow observed natural fractal patterns based on the value of Q raised to some power. The derivation of Q is discussed in more detail infra, and $Q^1$ is equal roughly to 2.118. This constant has been observed through exhaustive experimentation by the inventor to be reflected in fractal patterns of the trading behaviors of humans. A Q-level is composed of two displayed components, a price value and a "power rating".

The term "power rating" refers to a component of a Q-level that indicates to a system user the relative importance of the Q-level price as compared to its surrounding Q-level prices and thus serves as an aid to a system user to select the appropriate support and resistance levels from a range of displayed Q-level prices. Power ratings used in conjunction with the Q-levels are partially a function of exponent from this formulation and are used somewhat similar to how seismic ratings are used to assign strength to earthquakes. The derivation of power ratings is discussed in detail infra.

The term "Q-scale" generally refers to a set of Q-levels that represents to a user a range of all potential prices. In a typical embodiment, a Q-scale can be "zoomed" in and out to reflect different levels of granularity of pricing levels that a user needs to consider. Further, a typical Q-scale provides a visual indicator on each listed price/Q-level, relative to the assigned power rating, to denote the relative importance of a given price to a system user. A displayed Q-scale at the maximum "zoomed-out" value displays all of the Q-levels between the values of $Q^{-8}$ to $Q^8$. In a sense, the entire range of Q-levels displayed by a fully zoomed-out Q-scale represents something akin to a Periodic Table of Prices; that is, the structure of human behaviors in numbers. The system proposed herein reflects a practical application of this observed structure. In practice, a Q-scale display is often altered by the system user by a decimal offset (e.g., a factor of 100) to make the displayed Q-level prices more comfortable for the system user to digest intellectually. A "base Q-scale" contains numbers that have not had any decimal-point adjustments, such as 1.00 ($Q^0$), 2.118 ($Q^1$), or 1.445 ($Q^{1.5}$).

The term "Q-distance" generally refers to each range of values that spans the numeric "distance" between a first value of Q raised to the power some whole number and a second value of Q raised to the power of some whole number, where the second exponent is the next whole number above or below the first exponent. Q-distances are important because they define major divisions within the Q-scale upon which power ratings are partially dependent.

The term "placement" generally refers to the locating of a price of a security or commodity upon a Q-scale region relative to the $Q^0$ value of 1.00 that serves as a starting point for the analysis of surrounding Q-levels.

The term "Q-price" is used to distinguish that a price being referred to has been converted via decimal-point movement to a standard format relative to values found in the "base Q-scale". The "base Q-scale" is defined as the Q-scale that has no changes to decimal point positioning in displayed prices after raising Q to some power throughout the scale. A Q-price is expressed by changing the decimal format of a normal price to agree with a desired distance from the central value of 1.00 in the base Q-scale range. An example of a Q-price is 1.00 itself. In this example, while the external value of a given stock might be 100.00, it is important to know for sure that the user intends to see Q-levels in the area of 1.00 ($Q^0$), and not 100.00 ($Q^{3.07}$), which would yield a completely different group of Q-levels. Thus, Q-price is the price needed to calculate desired nearby Q-levels, including their power ratings.

Detailed Explanation of Q-Levels, Q-Scales, and Placement

Price is a variable factor that oscillates in a rhythm over time. Time, however, is a constant factor that humans cannot change. Trading is a human activity of ups and downs over time, measured in price movement. Hence, the time component is measured from one minute added to the next minute, in turn added to the next, etc., and this growing amount of time is fixed and cannot be changed. It can be observed that one can see time blocks composed of Q-separated amounts of minutes always reaching back into the past. Continuing this line of thought, one minute is used as a starting "look-back" time period. Larger look-back periods are kept "in synch" with Q from one another, so the boundary between any two "look-back" periods is equally spaced to the smaller one below and the larger one above. The exact "look-back" periods are 1 ($Q^0$), 2.118 ($Q^1$), 4.486 ($Q^2$), 9.5 ($Q^3$), and so on. These time periods happen to generally correspond to accepted chart time frames in many existing trading-chart software programs. From this, individual candles or bars on a chart in such a software program can be seen. This "natural" confirmation told the inventor that Q-based measures were on the right track on how to define time frames.

Another "natural" confirmation was found that seemed to align with to fit the 1000-minute time block. When this block was expanded according to Q to the very large blocks of 20124, 42625, 90281, and 191218 minutes and divided by a 405-minute trading "day", the commonly accepted simple moving average periods of 50, 100, 200, and 500 days lined up.

(The exact numbers were 50, 105, 223, and 472 days.) To repeat, using the 1000-minute block of time as a larger starting point, blocks of time were observed corresponding to 2118, 4486, 9501, 20124, and so on, that were divided by one trading "day' (405 minutes), with each block of time being equally separated above and below by Q. (Later, the inventor used exponents of Q to identify these "fractals" of Q.) Smaller intraday blocks of time were produced by dividing Q-spaced intervals from larger blocks of time. The backwards reduction of time blocks produced 1000, 472, 223, 105, 50, and 23. (The 23-minute time block was set as the minimum block of time that would be observed.)

The goal of these observations was to find a way to consistently observe price over time through an effective constant, Q. Q-spaced periods of time were used, looking back always from the moment-to-moment price behavior and always dividing these blocks of time by Q intervals of size, which happened to coincide to daily timeframes of historical significance (e.g., 50, 100, 200, 500).

The efforts to standardize the view of price over time led to an important observation about the use of Q in a new and original method of establishing effective support and resistance levels in price values. In turn, this led to the development of Q-levels and the Q-scale.

The use of Q as a basis for technical indicators, including support and resistance levels, results in a unified and simple model of price behavior for trading purposes. However, it is important to note that an important aspect of many embodiments of the inventive disclosures contained herein is the discovery of the various Q-levels, which is a separate concept from using Q-based time-block technical indicators.

For purposes of discussion of the principles underlying Q-levels, and for simplification, price will be described as being roughly half-way between a target and support level. To facilitate this discussion, a model of measurement of price according to Q is constructed. To support this, it will be postulated that price, the actual value in dollars and cents, actually means something in and of itself, and that the value of 1.00 is somehow of upmost importance as a value to attain. Therefore, price is an independent indicator to help in making trading decisions. These seemingly obvious concepts are really not considered by many in the trading business.

When price stands on a midline and the system looks up one distance at the price target (resistance level) and back one equal distance at the price support level, the entire range contained between these two points is a potential movement as a whole field of play. The price can be expected to move half the distance of the entire range from the midline to meet serious resistance. Conversely, going the same distance along the range in the opposite direction would hit the price's support level, and should trigger a "buy" decision by the trader. The price midpoint discussed above is the initial Q-level, and to get the target value (resistance level) the system needs to multiply the current price by Q, and to determine the support level, the system needs to divide the price by Q.

For instance, suppose that the price of a security is at the one-dollar level ($Q^0$). Ahead, the system displays to a trader a target of two dollars and 12 cents ($1.00×Q=$2.12, which is $Q^1$). As a support level, the trader can see that the system has displayed a support level of 47 cents ($1.00÷Q=$0.47, which is $Q^{-1}$). To grow from one dollar to $2.12 is a meaningful move. In fact, it would be a 118% positive change from the current value. However, to go down to $0.47 would also be a big move—a loss of about half of the current value.

The immediately preceding example is not typical of many trades because trades seldom are held long enough to go an entire Q-distance. Instead, smaller intervals of Q are needed. To find smaller intervals, the system needs to subdivide the Q range first into a half, then into a quarter, then into an eight, and so on. This also tracks with what is typically observed with human trading behavior in that traders tend to set targets and sub-targets in their mind based on midpoint subdivisions across pricing distances. Each time the Q-distance is divided, the resulting smaller-interval values are considered Q-levels; however, they are also considered less significant compared to the support and resistance levels, each of which are separated from the starting price by an entire factor of Q.

Further, these Q-levels can be expressed as being some quotient of Q being reduced. To do this, exponential notation is used. In the immediate example, price was at one dollar ($Q^0$). Multiplying by Q yields $2.12 ($Q^1$), while dividing by Q yields $0.47 ($Q^{-1}$). To add further intervals within the range of this example, the system merely inserts Q raised to various powers between −1 and 1. For ease to digest the numbers displayed, the Q-levels are rounded to the nearest hundredth decimal place.

A typical Q-scaled display lays out the pricing numbers much like an ordinary ruler. For example, a very simple Q-scale is presented in FIG. 4.

Figure 4:
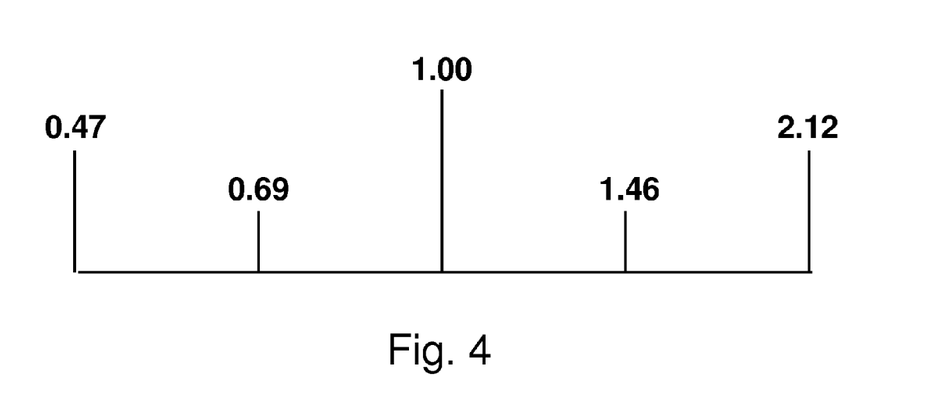
FIG. 4 depicts an example of a simplified Q-scale.

The difference in vertical line sizes in FIG. 4 indicates the relative importance of each Q-level in the simple Q-scale above. Of course, the above example is extremely simplified, and in practice, many more intervening Q-levels of varying significance would be employed, and in a typical embodiment of the system, the user can select a "zoom" feature to change the scale to display more or less intervals between major Q-levels Like a ruler, the subparts of FIG. 4 can be viewed as fractions of the larger whole ruler. A Q-scale has fractions too, but they are found in the exponent of Q. A ruler may have 1/8, 1/4, 3/8, 1/2, 5/8, 3/4, and 7/8 in the space of one inch, while a Q-scale would have $Q^{1/8}, Q^{1/4}, Q^{3/8}, Q^{1/2}, Q^{5/8}, Q^{3/4},$ and $Q^{7/8}$ within a single Q-distance.

In practice, a Q-level includes two components: a price and a power rating for that price. The power rating indicates to a system user the relative importance of the Q-level price as compared to its surrounding Q-level prices. The rating is a reflection of the magnitude of the fraction in the exponent of Q. The power ratings used in conjunction with the Q-levels are used somewhat similar to how seismic ratings are used to assign strength to earthquakes.

$$l = (l_p, l_r)$$

where l is a Q-level.

While every price $l_p$ is exact and unique, the power rating $l_r$ is assigned from a small range of values, normally no more than 15 or so that follow some order of relative importance from hardly any importance to extremely important. In the above example Q-scale, the most important Q-level is 1.00. The price part $l_p$ is defined as some value resulting from the raising of Q to some special exponent. That exponent is defined as a fraction having multiples of 2 in the denominator of the fraction and is denoted by $2^n$.

$$l_p = (Q^{\frac{m}{2^n}})$$

where m, n are integers.
The power-rating component, $l_r$, is r.

$$l = (Q^{\frac{m}{2^n}}, r)$$

where l is a Q-level.

Note that if m is an even number, the exponent could be reduced by dividing m by 2.

To display for the user a desired range of prices (Q-levels), a sufficient range of Q-levels is constructed as set S.

$$S = [Q^{\frac{m}{2^n}}, r_m]$$

which means that a price-power rating pair is created for each m.

The value range for m is denoted by $m_1$ and $m_2$. The resultant set of Q-levels is $$S = [Q^{\frac{m_1 \ldots m_2}{2^n}}, r_m]$$

Because there are prices below 1.00, as well as prices above 1.00, the system imposes the structure of $-m_1 \ldots m_2$ to ensure that 0 is included.

$$S = [Q^{\frac{-m_1 \ldots m_2}{2^n}}, r_m]$$

In order to provide symmetry and a sufficiently large range for the levels, boundaries in $m_1 \ldots m_2$ are established at some power of 2, created by boundaries $b_1$ and $b_2$.

$$S = [Q^{\frac{-2^{b_1} \ldots 2^{b_2}}{2^n}}, r_m]$$

where $m_1$ and $m_2$ are boundaries and b values are positive.

For every price created for some unique m in the set S, there is an $r_m$ value. It is computed by reducing the exponent of Q to its simplest form so that the numerator is an odd number. As noted earlier, reducing m is accomplished by adjusting the n in $2^n$. Once reduced, the n is the r for implementations where a small r means "important" and a big r means "not as important". For other implementations, r is −n to "flip" the size-to-importance relation and to attach more importance to big values.

As an example, FIG. 5 depicts a Q-scale display of a table of Q-levels, including assigned power ratings.

To facilitate more useful number ranges, the power rating formula is adjusted further by moving the range to suit the application. In many embodiments, this adjustment is accomplished by shifting the value of r over by making r=10−n. Further, to make a display to a user even easier to digest, a $10^k$ multiplier for decimal-point positioning is added to the formula for the Q-levels. In practice, an embodiment of the system would allow a user to dynamically alter this multiplier to enhance the readability of the displayed Q-scale, depending on how any particular financial instrument is typically displayed.

$$S = \left[10^k \times Q^{\frac{m_1...m_2}{2^n}}, r_m\right]$$

where m, n, k, and r are integers; r=10−n, when m is odd. Therefore, any single pair in the set S is $$S = \left[10^k \times Q^{\frac{m}{2^n}}, r_m\right]$$

A specific example of the above discussion is as follows:

$$l_p = Q^{\frac{32768}{4096}} = Q^8 = \left(\frac{\sqrt{5}}{2} + 1\right)^8 \approx 2.118034^8 \approx 405.00783$$

The result 405.00783 would be referred to as the Q-price at this stage.

The formatting of price $l_p$ often is adjusted by a $10^k$ multiplier for final viewing on a display by a system user in order to conform to expected custom. In this case, for exemplary purposes, the rounded-for-convenience 405.01 is converted to a whole number by multiplying the value by $10^2$. Of course, not many things actually sell for $40501 per share or unit in practice. This example is at the extreme upper bound of the possible range of useable/normal prices. Also, because the Q-level price was shifted from 405.01 to 40501 via the $10^k$ factor, that same factor would be applied to all other Q-level prices in the Q-scale employed before actually displaying the values for the system user.

The other part of the Q-level pair, $l_r$, is the power rating.

$$l_r = Q^{\frac{32768}{4096}} = Q^{\frac{2^{15}}{2^{12}}} = Q^{\frac{2^3}{2^0}} = Q^{\frac{2^0}{2^{-3}}}$$

where n eventually equals −3.
Applying now the formula for adjusted r, where r=10−n:

r=10−(−3)=10+3=13

So, the power rating for this Q-level, $l_r$, equals 13.

Hence, in this example, the displayed Q-level pair would be [40501, 13]. In practice, most system users expect to see prices in terms of dollars and cents, so the system might display $40,501.00 for the internal price of 405.01.

When the next lower level is examined, which is Q raised to the power of the quantity 32767 divided by 4096, which works out to be 404.93 ($40,493.00 after the offset by the factor of 100), it can be observed that m (that is 32767) is odd. Therefore, no further reductions in the exponential fraction need take place and the exponent from the denominator, which is 12 (2 raised to the power of 12 equals 4096), is used to calculate the power rating. In this case, the power rating for the Q-price of 404.93 is:

r=10−(12)=−2

So, the power rating for this Q-level, $l_r$, equals −2, which means that the Q-price 404.93 is not very important.

Of course, it should be noted that either component of the Q-level can be represented textually or graphically to a system user in myriad ways, as would be most useful and convenient to the anticipated system user. For example, the power rating associated with a price could be represented by an actual number paired with the price, or by providing an associated line of a length that represents a relative "strength" of the price (Q-level) as compared to those appearing in the immediate vicinity on the Q-scale. Other graphical cues associated with the power ratings can incorporate color rankings, font weights, and other typographical indicators to help a system user recognize the relative importance of different Q-levels.

Finally, a key consideration when using a system that displays Q-scales and Q-levels is what initial pricing placement should be used to "seed" the system such that it produces a display of values useful to the system user. In many cases, a system user will input the current price of the security or commodity of interest in the format of a Q-price as defined infra and select a "zoom" level accordingly. In other embodiments, a seller might supply the initial placement value. Still in other embodiments, a data stream containing a snapshot of a quasi-real-time price level might be used.

In conclusion, pricing trends can be tracked to follow patterns as a function of Q, regardless of previous pricing history. This phenomenon can be taken advantage of by building and using a system that accounts for this behavior and provides a useful display or report to a user such as a day trader.

First Embodiment

Q-Card System

Because of the large volume of data to be compiled and considered by a system user, it would be impracticable for a user to attempt to manually use the algorithms described supra to assign pricing placements to track for selected securities or commodities and then identify the appropriate support and resistance Q-levels. Hence, the practical embodiments of the inventive disclosures herein necessarily need to incorporate the use of computing equipment, computer-readable mediums, and display devices (e.g., monitor screens, printers, etc.). Such a system may be a web-based system, where a system user interacts with the trading tool via some sort of client application on a remote computer, such as a web browser. The remote computer in such an embodiment can be a personal computer, a web-enabled mobile phone, or an interactive television system with connectivity to the Internet. In other embodiments, the system is a stand-alone personal computer or even a mobile phone capable of having custom applications installed and executed (e.g., a "Smart" phone).

In an embodiment, a general-purpose computer is communicatively coupled with a computer-readable medium that contains one or more programs to implement the algorithms described supra. One such program that has been developed is called Q-Card, which will be referred to henceforth, out of convenience. One embodiment of Q-Card is disclosed by way of detailed source code (in Borland Delphi programming language) in U.S. Patent Application No. 61/320,214, which is incorporated herein by reference. In one embodiment, Q-Card is implemented using Borland Delphi language; however, one skilled in the art will appreciate that the program could be implemented in almost any computing language. However, it should noted that all references to Q-Card and its variations are not intended to limit the scope of the inventive disclosure to that particular computer program and its associated computing system.

First, Q-Card creates a two-column array of size 65537 of real numbers in memory. Column 1 is for storing Q-based price values without offsetting decimal placements. The range of prices is from 0.002469 to 405.0078, with 1.00 in the middle. The range of these prices is $Q^{-8}$ to $Q^8$, including $Q^0$ for 1.00. Corresponding to each of these prices is an integer power rating in Column 2, ranging from −1 to 13, with the special case of 15 assigned to the price of 1.00. The following pseudo-code takes advantage of the orderly structure of the Q-scale to skip through the array in even increments as it builds the array. The result is the same as if applying the basic Q-level formula to establish the power rating to each increment of the Q-Scale, shown in the next embodiment. In the for-loop containing the while-loop, each of the 16 passes gets progressively quicker as ever-larger-spaced cells in the array are updated with an incrementally larger rating value. In the Q-Card application, this array-building method is implemented in FormActivate, where it makes the array available globally to the program:

```
const Q = 2.1180339887499; (One plus the quantity of the
square root of 5, divided by 2}
pr : array[1 . . 2,–32768 . . 32768] of double; {Global}
procedure FormActivate(Sender: TObject);
   var i, j : integer;
   begin
      { Create a global Q-Scale in memory of prices
      and power ratings
      Fill two columns with Q-levels(price, power rating)
      array with values to zoom –2 precision }
      { initialize Qprices }
      for i: = –32768 to 32768 do pr[1,i] := power(Q, i/4096);
      { initialize power ratings to 1 zoom below minimum }
      for i: = –32768 to 32768 do pr[2,i] := –3;
      { make multiple passes adding r to even multiples of 2 )
      for j := 0 to 15 do
      begin
         i := 0
         while i >= –32768 do begin
            pr[2,i] := pr[2,i] + 1; { assign neg values }
            pr[2, abs(i)] := pr[2,i]; { assign pos values }
            i := i - round(intpower(2, j));
         end
      end
      pr[2, 0] := 15; { power rating for Q raised to the zero power }
end
```

Of course, those ordinarily skilled in the art will appreciate that there are myriad programmatic ways to populate the needed arrays in memory with this data, and the above code example is only offered as a practical example as to how to make the needed data available to the rest of the system. In the case of this specific example, once the array is set up, the Q-Card program can display a frame of any 33 price levels by manipulating the array indexes. It always knows the power rating for the price by going to the second column of the array for that index. The system user can alter the display of the current price by using a graphical slider tool that also has a −32768 to 32768 index that corresponds to the Q-level array indexes.

In an alternate embodiment, Q-Card has a report that finds a power rating using a one-at-a-time approach for an already-computed logarithm of base Q. It takes two inputs: first, the logarithm that would create the price if it were to raise Q to that power, and second, the "zoom" level that the system user is currently viewing. The "zoom" level defines the range of the visible Q-scale on the display presented to the system user. The power-rating formula reduces the m (a boundary index in the range of the Q-scale) by the n factor in the denominator of the exponent, as discussed supra. The result is a number between −2 and 15, which represents the power rating for the Q-level. It should be noted that $Q^0$ equals 1.00, which is assumed to always be the most "important" Q-level, and is directly assigned a power rating of 15. As a practical matter, the upper bound of all other power ratings is usually capped at 13 in many embodiments, with only $Q^{-8}$ and $Q^8$ having those power ratings. (A power rating of "14" is unlikely to ever be used, as the Q-level prices associated with that power rating would in all likelihood be far too large or far too small to be considered in most trading scenarios.) An example of program code to implement this functionality is as follows:

```
procedure ezLevel(myLog : single; myZ : integer): string;
   var m, n, i : integer;
   begin
      n := 10 - myZ; { convert to internal zoom }
      if myLog = 0 then result := '15' else
      begin
         { find increments of internal zoom }
         m := Trunc(myLog/(1/intpower(2, n)));
         i := 0;
         while not odd(m) do
            begin
               m := m div 2;
               i := i + 1; { count up the divisions by 2, the "n" into
the "m" }
            end
         result := IntToStr(i + myZ); { convert back
to external zoom }
      end
   end
end
. . .
```

The above function is called to retrieve a string that represents the Q-level power rating for display/printout. The first argument in the function call is the logarithm of an already-calculated Q-level price, while the second argument is associated with the "zoom" level, which affects the displayed power rating as compared to the other displayed Q-levels within that zoom level by influencing how much reduction of the numerator (m) in the Q exponent occurs prior to the calculation of the power level.

Figure 6:
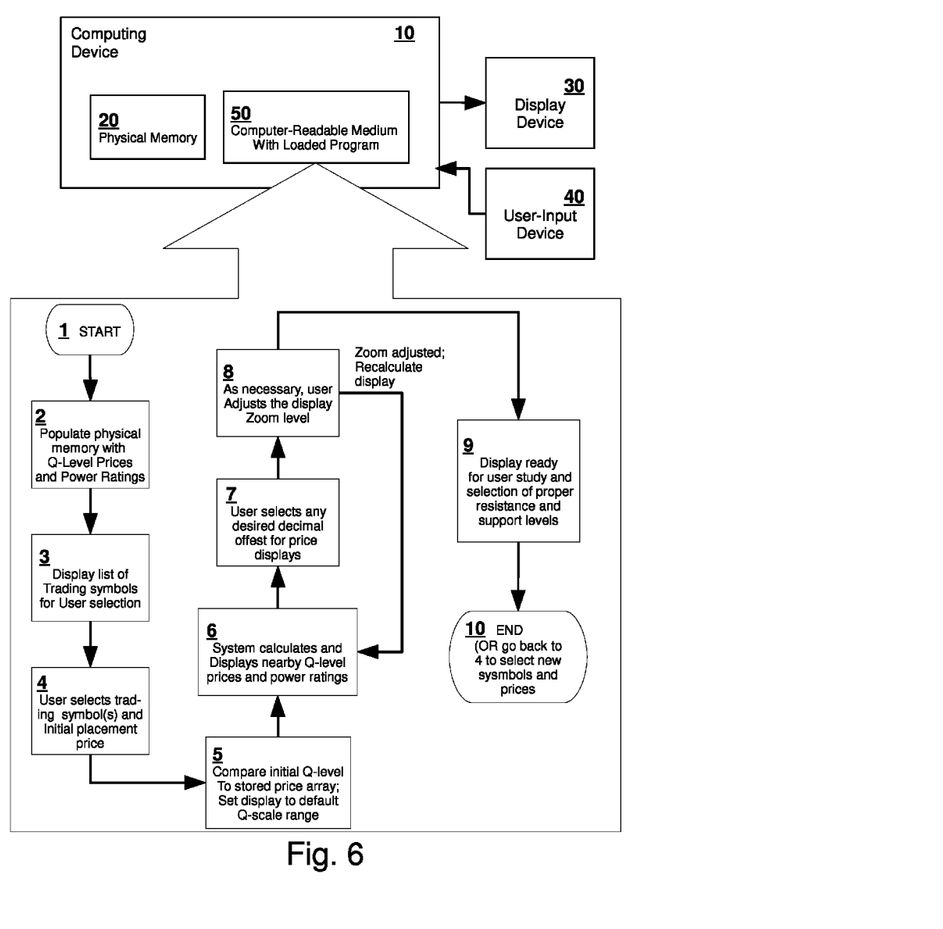
FIG. 6 depicts a simplified block diagram that shows the major physical components of the system, as well as the major process steps involved when using the system by executing its programming.

Applying the above discussion into an actual process flow within the system, refer to FIG. 6, which is a simplified diagram for one embodiment, which is an implementation of the Q-Card program on a computer system.

Q-Card is launched 1 by having the computer system 10 load the program 50 and it immediately populates the computer's 10 physical memory 20 with a two-dimensional array of Q-levels using the algorithms described supra 2. The first dimension of the array is comprised of the prices in Q-price form, and the second dimensions of the array is comprised of the power level that relates to each price in the first dimension of the array. In some embodiments, the generated two-dimensional array is stored in volatile memory 2, while in other embodiments, the generated two-dimensional array is stored in persistent memory 2, such as by writing the data to disk.

The system presents the system user with a list of trading symbols 3, such as would be seen on the board of a stock exchange, via a display device 30. Using a computer pointing device 40, the system user selects the desired trading symbol 4, and then also "places" the target symbol at an initial Q-level (price) 4. In some embodiments, the system user selects the placement by moving a graphical slider to point to the desired placement price. However, in other embodiments, a data stream can be used to insert a snapshot of a quasi-real-time price level in order to seed the process. In addition, in some embodiments, the system user may select a preferred decimal offset to make the displayed values visually and intellectually easier for the system user to digest.

The system then compares the selected initial Q-level to the stored price array 5 and then sets the display 30 to show a default range of Q-levels 5 in the vicinity of the selected Q-level (that is, a Q-scale), with a substantially equal number of Q-levels appearing both above and below the selected Q-level 6. The default maximum range that could be displayed is programmatically determined, and can vary from application to application. A typical predetermined maximum range would be Q-level prices from Q raised to the power of −8 to Q raised to the power of 8. For each Q-level in the display, a price and a power rating is displayed. In some embodiments, the power-rating number is displayed immediately next to the associated price. In other embodiments, the power ratings for each Q-level (that is, the relative importance) is displayed by typographical cues by varying the size and weight of the screen font for each Q-level, where more-important Q-levels are of larger and heavier font weights. In some embodiments, color cues may also be used. Still in other embodiments, varying sizes of scale lines (like those commonly seen on a ruler) are used as visual cues relating to the power ratings for the different Q-levels.

In some embodiments, the user can select a decimal offset for the Q-level prices to appear in a manner of convenience and intellectual comfort to the user 7. For example, an offset of 100 would change the display of Q-level price of 405.01 to 40501.

To see Q-levels outside the displayed Q-scale, the system user can choose to use a displayed scroll-bar tool and scroll up and down the list of Q-levels. Alternatively, the system user can then choose to adjust the displayed Q-scale by selecting a zoom level 8. In either case, the system recalculates which Q-levels to display 6, as well dynamically recalculates the power ratings of each displayed Q-level such that each displayed range of Q-levels still reflects the relative importance of each Q-level with respect to the current price placement (usually set by the system user) 6.

The system user then studies the current Q-scale display of Q-levels relative to the user-specified price placement (Q-level) and can determine by the display what the Q-based target support and resistance levels are 9. This is accomplished by finding the first Q-level below the placement price that has a power rating above that of the placement price Q-level, which represents the support level, and by finding the first Q-level above the placement price Q-level, which represents the resistance level.

Second Embodiment

Q-Card System Validator of Other Technical-Indicator Systems

Figure 7:
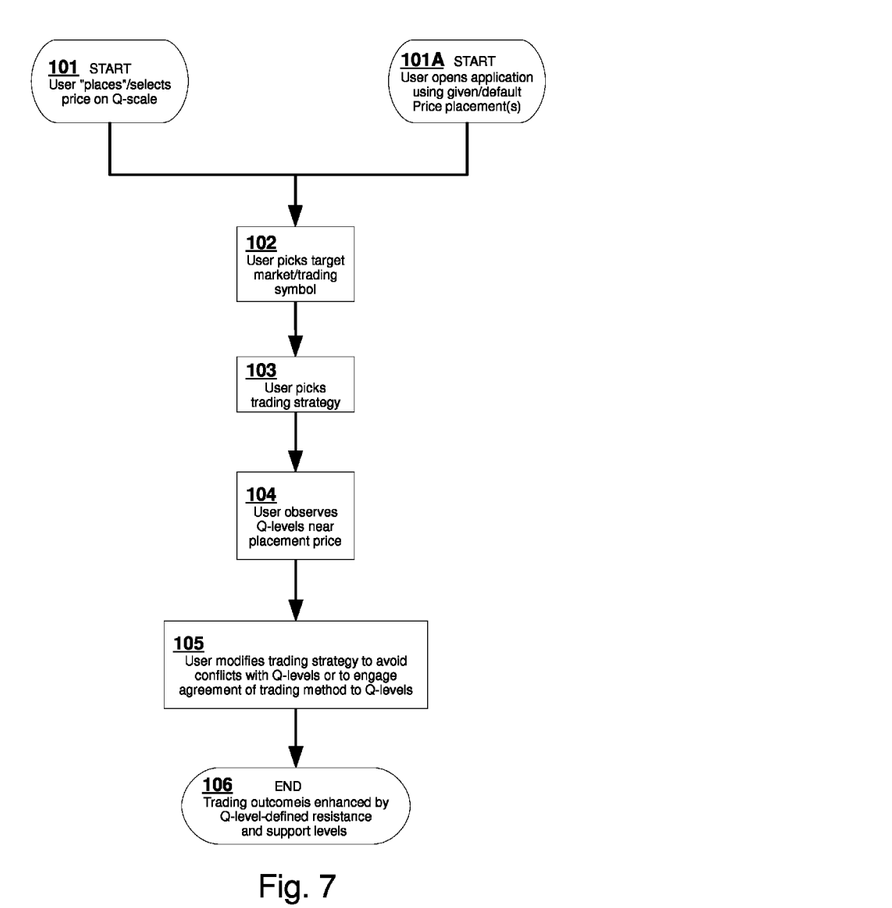
FIG. 7 depicts a simple process flow diagram of the steps involved when a user employs a Q-level system to validate a non-Q-level-based system.

In another embodiment, the exemplary Q-Card System, as described in the First Embodiment, supra, (or similar system employing the same principles and base algorithms), can be used to validate and/or calibrate any of the many existing prior-art systems discussed in the Background section, supra. For example, a trader and practitioner of another prior-art solution that relies on historical pricing patterns or other less-than-scientific inputs could validate their system results against a Q-Card system whose pricing strata is unreliant on such things. Further, where inaccuracies in the prior-art system are identified by the Q-Card system, a trader can calibrate his or her prior-art system to help account for those inherent inaccuracies. Referring to FIG. 7, a system user places/selects a placement price on the Q-scale 101. Alternatively, the system user can instead rely on the system opening with a default placement or even a real-time/quasi-real-time pricing placement based on an incoming data stream 101A. The system user picks one or more trading symbols representing the security(ies) and/or commodity(ies) that are to be tracked 102.

The system user then adopts his or her trading strategy 103, and observes the Q-levels near the initial placement price 104. If the system user observes that his or her trading strategy for a given security or commodity is in agreement with the current resistance and/or support levels prescribed by the Q-Card system 105, then no action is required. On the other hand, if the system user finds that his or her trading strategy is leading the system user to sell or buy a given security or commodity in conflict with the Q-level-based resistance or support level, then the system user would modify the trading strategy 105. The goal is to enhance the effectiveness of the prior-art trading strategy being used by the system user.

Third Embodiment

A System for Supporting Trading Decisions

Referring to FIG. 6, this embodiment encompasses a system for supporting trading decisions for securities and/or commodities, comprising: a computing system 10; at least one display device 30 for presenting rendered data, the rendered data including support and resistance levels for the price of a user-identified security or commodity, and wherein the display device 30 can be any type of computer video monitor, mobile phone screen, television monitor, or printing device; an input device 40 for user interaction with the computing system 10; a physical memory 20 in the computing system 10; and a computer-readable medium 50 for use with the computing system 10, the computer-readable medium 50 comprising at least one program for identifying and displaying support and resistance levels for the price of a user-identified security or commodity, the at least one program capable of causing the computing system 10 to implement a process comprising the steps of:

creating in the computing system's 10 physical memory 20 with at least one array for storing a plurality of Q-levels;

populating the at least one Q-level array with individual Q-levels, which may be equally spaced in terms of price magnitudes, each individual Q-level comprising a price and an associated power rating, wherein the price level is based on the value Q raised to an exponential power, which the exponential power can be expressed as a fraction having an integer numerator and a base-2 denominator raised to a power, and wherein if the price level is equal to 1, then said associated power rating is assigned the value of 15; otherwise, the associated power rating is derived by first reducing the exponential fraction until the numerator is equal to 1 or is odd, whichever occurs first, then subtracting the base-2 logarithm of the denominator from 10, thus resulting in the associated power rating;

displaying on the display device 30 a list of trading symbols for the user to select, or allowing the user to input one or more trading symbols, each trading symbol associated with a security or commodity;

seeding the system with an initial Q-level placement price;

comparing the user-selected Q-level placement to the at least one stored Q-level array in order to create an initial Q-scale that displays at least a default range of Q-levels covering the Q-distance that contains the user-selected Q-level placement,
    wherein the Q-levels are restricted to prices ranging from Q raised to the power of −8 to Q raised to the power of 8, and
    wherein a substantially equal number of Q-levels within the initial Q-scale appears both above and below the user-selected selected Q-level on the display device 30; and
displaying on the display device 30 a price and a power rating for each Q-level,
    wherein the display 30 incorporates a graphical hierarchy that displays the relative importance of the Q-levels based on the values of the power rating associated with each Q-level;
thereby allowing a user to study the display of Q-levels relative to the user-specified Q-level placement price and determine what the Q-based target support and resistance levels are,
    whereby the support level is determined by finding the first Q-level below said Q-level placement price that has a power rating above that of the Q-level placement price, which represents the support level, and
    whereby the resistance level is determined by finding the first Q-level above the Q-level placement price that has a power rating above that of the Q-level placement price, which represents the resistance level.

This embodiment can be further enhanced wherein the seeding of the system occurs by allowing said user to select or input 40 an initial Q-level placement price.

This embodiment can be further enhanced wherein the seeding of the system with an initial Q-level placement price occurs independent of user input by causing the system to seed itself using a process selected from the group comprising reading a data stream that comprises a real-time initial price level, reading a data stream that comprises a quasi-real-time initial price level, and programmatically determining the initial price level.

This embodiment can be further enhanced wherein the at least one program allows a user to customize the display of prices on said display device 30 by providing a decimal-place offset.

This embodiment can be further enhanced wherein the at least one program allows a user to customize the display of prices on the display device 30 by providing a zoom function that dynamically alters the visible high-to-low range of prices, and wherein the system recalculates which Q-levels to display, as well dynamically recalculates the power ratings of each displayed Q-level such that each displayed range of Q-levels still reflects the relative importance of each Q-level with respect to the price placement.

This embodiment can be further enhanced wherein the graphical hierarchy that displays the relative importance of said Q-levels is accomplished by displaying the associated power rating next to the associated Q-level.

This embodiment can be further enhanced wherein the graphical hierarchy that displays the relative importance of the Q-levels is further accomplished by increasing the font weight and size of a Q-level as its relative importance increases.

This embodiment can be further enhanced wherein the graphical hierarchy that displays the relative importance of the Q-levels is accomplished by adding ruler-style gradations to the Q-scale display, wherein the relative importance of the Q-levels is generally proportional to the associated gradation line length.

This embodiment can be further enhanced wherein the computing system 10 is selected from the group consisting of a personal computer, a mobile phone capable of downloading and running user applications, and an interactive television set connected to the Internet.

This embodiment can be further enhanced wherein the computing system 10 is an Internet web-based application with which the system user interacts using a web-client application via a remote second computing system, and the second computing system can be a personal computer, a web-enabled mobile phone, or an interactive television system with connectivity to the Internet.

Fourth Embodiment

A Method for Making Buy and Sell Trading Decisions

Referring to FIG. 6, this embodiment encompasses a method for making buy and sell trading decisions for securities and/or commodities, comprising the steps of: obtaining a computing system 10; obtaining at least one display device 30 for presenting rendered data, the rendered data including support and resistance levels for the price of a user-identified security or commodity, and wherein the display device 30 can be any type of computer video monitor, mobile phone screen, television monitor, or printing device; obtaining an input device 40 for user interaction with the computing system 10; obtaining a physical memory 20 in the computing system; and obtaining a computer-readable medium 50 for use with the computing system 10, the computer-readable medium 50 comprising at least one program for identifying and displaying support and resistance levels for the price of a user-identified security or commodity, the at least one program capable of causing the computing system 10 to implement a process comprising the steps of:
    creating in the computing system's 10 physical memory 20 with at least one array for storing a plurality of Q-levels;
    populating the at least one Q-level array 2 with individual Q-levels, which may be equally spaced in terms of price magnitudes, each individual Q-level comprising a price and an associated power rating,
        wherein the price level is based on the value Q raised to an exponential power, which the exponential power can be expressed as a fraction having an integer numerator and a base-2 denominator raised to a power, and
        wherein if the price level is equal to 1, then said associated power rating is assigned the value of 15; otherwise, the associated power rating is derived by first reducing the exponential fraction until the numerator is equal to 1 or is odd, whichever occurs first, then subtracting the base-2 logarithm of the denominator from 10, thus resulting in the associated power rating;
    displaying on the display device 3, 30 a list of trading symbols for the user to select, or allowing the user to input one or more trading symbols 4, 40, each trading symbol associated with a security or commodity;
    seeding the system with an initial Q-level placement price 4, 40;
    comparing the user-selected Q-level placement to the at least one stored Q-level array 5 in order to create an initial Q-scale that displays at least a default range of Q-levels 5 covering the Q-distance that contains the user-selected Q-level placement, wherein the Q-levels are restricted to prices ranging from Q raised to the power of −8 to Q raised to the power of 8, and wherein a substantially equal number of Q-levels within the initial Q-scale appears both above and below the user-selected selected Q-level on the display device 30; and displaying on the display device 30 a price and a power rating for each Q-level 6, wherein the display 30 incorporates a graphical hierarchy that displays the relative importance of the Q-levels based on the values of the power rating associated with each Q-level;

the method further comprising the steps of: by a user, launching the program on the computing system 1, 10; by a user, selecting or inputting 4, 40 an initial Q-level placement price; by a user, selecting or inputting 4, 40 a trading symbol for the security or commodity of interest; by a user, studying the display 9, 30 of Q-levels relative to said user-specified Q-level placement price and determine what the Q-based target support and resistance levels are, wherein the support level is determined by finding the first Q-level below the Q-level placement price that has a power rating above that of the Q-level placement price, which represents the support level, and wherein the resistance level is determined by finding the first Q-level above the Q-level placement price that has a power rating above that of the Q-level placement price, which represents the resistance level; and by a user, making a buy decision before the price for the security or commodity of interest goes below the support level, and/or making a sell decision before the price for the security or commodity of interest goes above the resistance level.

This embodiment can be further enhanced wherein the seeding of the system occurs by allowing said user to select or input 40 an initial Q-level placement price.

This embodiment can be further enhanced wherein the seeding of the system with an initial Q-level placement price occurs independent of user input by causing the system to seed itself using a process selected from the group comprising reading a data stream that comprises a real-time initial price level, reading a data stream that comprises a quasi-real-time initial price level, and programmatically determining the initial price level.

This embodiment can be further enhanced wherein the at least one program allows a user to customize the display of prices on said display device 30 by providing a decimal-place offset, the method further comprising the step of: by a user, as necessary to display Q-level prices in a convenient format, inputting the decimal-place offset 7.

This embodiment can be further enhanced wherein the at least one program allows a user to customize the display of prices on the display device 30 by providing a zoom function that dynamically alters the visible high-to-low range of prices, and wherein the system recalculates which Q-levels to display, as well dynamically recalculates the power ratings of each displayed Q-level such that each displayed range of Q-levels still reflects the relative importance of each Q-level with respect to the price placement; the method further comprising the step of: by a user, as necessary to display the Q-scale in a convenient range, selecting the zoom level to increase or decrease the overall displayed range of Q-levels 8.

This embodiment can be further enhanced wherein the graphical hierarchy that displays the relative importance of said Q-levels is accomplished by displaying the associated power rating next to the associated Q-level.

This embodiment can be further enhanced wherein the graphical hierarchy that displays the relative importance of the Q-levels is further accomplished by increasing the font weight and size of a Q-level as its relative importance increases.

This embodiment can be further enhanced wherein the graphical hierarchy that displays the relative importance of the Q-levels is accomplished by adding ruler-style gradations to the Q-scale display, wherein the relative importance of the Q-levels is generally proportional to the associated gradation line length.

This embodiment can be further enhanced wherein the computing system 10 is selected from the group consisting of a personal computer, a mobile phone capable of downloading and running user applications, and an interactive television set connected to the Internet.

This embodiment can be further enhanced wherein the computing system 10 is an Internet web-based application with which the system user interacts using a web-client application via a remote second computing system, and the second computing system can be a personal computer, a web-enabled mobile phone, or an interactive television system with connectivity to the Internet.

Fifth Embodiment

A Method for Validating a System for Making Buy and Sell Trading Decisions

Referring to FIG. 6, this embodiment encompasses a method for validating a non-Q-level-based system for making buy and sell trading decisions for securities and/or commodities, the non-Q-level-based system based on technical indicators, comprising the steps of: by a user, obtaining the non-Q-level-based system for making buy and sell trading decisions for securities and/or commodities and using the non-Q-level-based system to establish target support and resistance levels for a user-specified security or commodity; by a user, obtaining a computing system 10; by a user, obtaining at least one display device 30 for presenting rendered data, said rendered data including support and resistance levels for the price of a user-identified security or commodity, and wherein the display device 30 can be any type of computer video monitor, mobile phone screen, television monitor, or printing device; by a user obtaining an input device 40 for user interaction with the computing system 10; by a user, obtaining a physical memory 20 in the computing system 10; and by a user, obtaining a computer-readable medium 50 for use with the computing system 10, the computer-readable medium 50 comprising at least one program for identifying and displaying support and resistance levels for the price of a user-identified security or commodity, the at least one program capable of causing the computing system 10 to implement a process comprising the steps of:

creating in the computing system's 10 physical memory 20 with at least one array for storing a plurality of Q-levels;

populating the at least one Q-level array 2 with individual Q-levels, which may be equally spaced in terms of price magnitudes, each individual Q-level comprising a price and an associated power rating, wherein the price level is based on the value Q raised to an exponential power, which the exponential power can be expressed as a fraction having an integer numerator and a base-2 denominator raised to a power, and wherein if the price level is equal to 1, then said associated power rating is assigned the value of 15; otherwise, the associated power rating is derived by first reducing the exponential fraction until the numerator is equal to 1 or is odd, whichever occurs first, then subtracting the base-2 logarithm of the denominator from 10, thus resulting in the associated power rating;

displaying on the display device 3, 30 a list of trading symbols for the user to select, or allowing the user to input one or more trading symbols 4, 40, each trading symbol associated with a security or commodity;

seeding the system with an initial Q-level placement price 4, 40;

comparing the user-selected Q-level placement to the at least one stored Q-level array 5 in order to create an initial Q-scale that displays at least a default range of Q-levels 5 covering the Q-distance that contains the user-selected Q-level placement, wherein the Q-levels are restricted to prices ranging from Q raised to the power of −8 to Q raised to the power of 8, and wherein a substantially equal number of Q-levels within the initial Q-scale appears both above and below the user-selected selected Q-level on the display device 30; and displaying on the display device 30 a price and a power rating for each Q-level 6, wherein the display 30 incorporates a graphical hierarchy that displays the relative importance of the Q-levels based on the values of the power rating associated with each Q-level;

the method further comprising the steps of: by a user, launching the program on the computing system 1, 10; by a user, selecting or inputting 4, 40 an initial Q-level placement price; by a user, selecting or inputting 4, 40 a trading symbol for the security or commodity of interest; by a user, studying the display 9, 30 of Q-levels relative to said user-specified Q-level placement price and determine what the Q-based target support and resistance levels are, wherein the support level is determined by finding the first Q-level below the Q-level placement price that has a power rating above that of the Q-level placement price, which represents the support level, and wherein the resistance level is determined by finding the first Q-level above the Q-level placement price that has a power rating above that of the Q-level placement price, which represents the resistance level; and by a user, comparing the support and resistance levels determined using the non-Q-level-based system with the support and resistance levels determined using a Q-level-based system, and by a user, calibrating the non-Q-level-based system to account for any errors detected.

This embodiment can be further enhanced wherein the seeding of the system occurs by allowing said user to select or input 40 an initial Q-level placement price.

This embodiment can be further enhanced wherein the seeding of the system with an initial Q-level placement price occurs independent of user input by causing the system to seed itself using a process selected from the group comprising reading a data stream that comprises a real-time initial price level, reading a data stream that comprises a quasi-real-time initial price level, and programmatically determining the initial price level.

This embodiment can be further enhanced wherein the at least one program allows a user to customize the display of prices on said display device 30 by providing a decimal-place offset, the method further comprising the step of: by a user, as necessary to display Q-level prices in a convenient format, inputting the decimal-place offset 7.

This embodiment can be further enhanced wherein the at least one program allows a user to customize the display of prices on the display device 30 by providing a zoom function that dynamically alters the visible high-to-low range of prices, and wherein the system recalculates which Q-levels to display, as well dynamically recalculates the power ratings of each displayed Q-level such that each displayed range of Q-levels still reflects the relative importance of each Q-level with respect to the price placement; the method further comprising the step of: by a user, as necessary to display the Q-scale in a convenient range, selecting the zoom level to increase or decrease the overall displayed range of Q-levels 8.

This embodiment can be further enhanced wherein the graphical hierarchy that displays the relative importance of said Q-levels is accomplished by displaying the associated power rating next to the associated Q-level.

This embodiment can be further enhanced wherein the graphical hierarchy that displays the relative importance of the Q-levels is further accomplished by increasing the font weight and size of a Q-level as its relative importance increases.

This embodiment can be further enhanced wherein the graphical hierarchy that displays the relative importance of the Q-levels is accomplished by adding ruler-style gradations to the Q-scale display, wherein the relative importance of the Q-levels is generally proportional to the associated gradation line length.

This embodiment can be further enhanced wherein the computing system 10 is selected from the group consisting of a personal computer, a mobile phone capable of downloading and running user applications, and an interactive television set connected to the Internet.

This embodiment can be further enhanced wherein the computing system 10 is an Internet web-based application with which the system user interacts using a web-client application via a remote second computing system, and the second computing system can be a personal computer, a web-enabled mobile phone, or an interactive television system with connectivity to the Internet.

Alternative Embodiments and Other Variations

The various embodiments and variations thereof described herein and/or illustrated in the accompanying Figures are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the claims which follow.

What is claimed is:

1. A system for supporting trading decisions for securities and/or commodities, comprising:
 a computing system;
 at least one display device for presenting rendered data, said rendered data including support and resistance levels for the price of a user-identified security or commodity;
 an input device for user interaction with said computing system;
 a physical memory in said computing system; and
 computer-readable medium for use with said computing system, said computer-readable medium comprising at least one program for identifying and displaying support and resistance levels for the price of said user-identified security or commodity, said at least one program capable of causing said computing system to implement a process comprising the steps of:
creating in said computing system's physical memory with at least one array for storing a plurality of Q-levels;
populating said at least one Q-level array with individual Q-levels, each said individual Q-level comprising a price and an associated power rating,
wherein said price level is based on the value Q raised to an exponential power, which said exponential power can be expressed as a fraction having an integer numerator and a base-2 denominator raised to a power, and
wherein if said price level is equal to 1, then said associated power rating is assigned the value of 15; otherwise, said associated power rating is derived by first reducing said exponential fraction until said numerator is equal to 1 or is odd, whichever occurs first, then subtracting the base 2 logarithm of said denominator from 10, thus resulting in said associated power rating;
displaying on said display device a list of trading symbols for said user to select, or allowing said user to input one or more trading symbols, each said trading symbol associated with a security or commodity;
seeding the system with an initial Q-level placement price;
comparing said user-selected Q-level placement to said at least one stored Q-level array in order to create an initial Q-scale that displays at least a default range of Q-levels covering the Q-distance that contains said user-selected Q-level placement,
wherein said Q-levels are restricted to prices ranging from Q raised to the power of −8 to Q raised to the power of 8, and
wherein a substantially equal number of Q-levels within said initial Q-scale appears both above and below said user-selected selected Q-level on said display device; and
displaying on said display device a price and a power rating for each said Q-level,
wherein said display incorporates a graphical hierarchy that displays the relative importance of said Q-levels based on the values of the power rating associated with each said Q-level;
thereby allowing a user to study said display of Q-levels relative to said user-specified Q-level placement price and determine what the Q-based target support and resistance levels are,
whereby said support level is determined by finding the first Q-level below said Q-level placement price that has a power rating above that of said Q-level placement price, which represents the support level, and
whereby said resistance level is determined by finding the first Q-level above said Q-level placement price that has a power rating above that of said Q-level placement price, which represents the resistance level.

2. The system of claim 1, wherein said seeding of the system occurs by allowing said user to select or input an initial Q-level placement price.

3. The system of claim 1, wherein said seeding of the system with an initial Q-level placement price occurs independent of user input by causing the system to seed itself using a process selected from the group comprising reading a data stream that comprises a real-time initial price level, reading a data stream that comprises a quasi-real-time initial price level, and programmatically determining the initial price level.

4. The system of claim 1, wherein said at least one program allows a user to customize the display of prices on said display device by providing a decimal-place offset.

5. The system of claim 1, wherein said at least one program allows a user to customize the display of prices on said display device by providing a zoom function that dynamically alters the visible high-to-low range of prices, and
wherein the system recalculates which Q-levels to display, as well dynamically recalculates the power ratings of each displayed Q-level such that each displayed range of Q-levels still reflects the relative importance of each Q-level with respect to said price placement.

6. The system of claim 1, wherein said graphical hierarchy that displays the relative importance of said Q-levels is accomplished by displaying said associated power rating next to said associated Q-level.

7. The system of claim 6, wherein said graphical hierarchy that displays the relative importance of said Q-levels is further accomplished by increasing the font weight and size of a Q-level as its relative importance increases.

8. The system of claim 1, wherein said graphical hierarchy that displays the relative importance of said Q-levels is accomplished by adding ruler-style gradations to said Q-scale display, wherein the relative importance of said Q-levels is generally proportional to the associated gradation line length.

9. The system of claim 1, wherein said computing system is selected from the group consisting of a personal computer, a mobile phone capable of downloading and running user applications, and an interactive television set connected to the Internet.

10. The system of claim 1, wherein:
said computing system is an Internet web-based application with which said system user interacts using a web-client application via a remote second computing system, and
said second computing system can be a personal computer, a web-enabled mobile phone, or an interactive television system with connectivity to the Internet.

11. A method for making buy and sell trading decisions for securities and/or commodities,
comprising the steps of:
obtaining a computing system;
obtaining at least one display device for presenting rendered data, said rendered data including support and resistance levels for the price of a user-identified security or commodity;
obtaining an input device for user interaction with said computing system;
obtaining a physical memory in said computing system; and
obtaining a computer-readable medium for use with said computing system, said computer-readable medium comprising at least one program for identifying and displaying support and resistance levels for the price of said user-identified security or commodity, said at least one program capable of causing said computing system to implement a process comprising the steps of:
creating in said computing system's physical memory with at least one array for storing a plurality of Q-levels;
populating said at least one Q-level array with individual Q-levels, each said individual Q-level comprising a price and an associated power rating,
wherein said price level is based on the value Q raised to an exponential power, which said exponential power can be expressed as a fraction having an integer numerator and a base-2 denominator raised to a power, and wherein if said price level is equal to 1, then said associated power rating is assigned the value of 15;

otherwise, said associated power rating is derived by first reducing said exponential fraction until said numerator is equal to 1 or is odd, whichever occurs first, then subtracting the base 2 logarithm of said denominator from 10, thus resulting in said associated power rating;

displaying on said display device a list of trading symbols for said user to select, or allowing said user to input one or more trading symbols, each said trading symbol associated with a security or commodity;

seeding the system with an initial Q-level placement price;

comparing said user-selected Q-level placement to said at least one stored Q-level array in order to create an initial Q-scale that displays at least a default range of Q-levels covering the Q-distance that contains said user-selected Q-level placement, wherein said Q-levels are restricted to prices ranging from Q raised to the power of −8 to Q raised to the power of 8, and wherein a substantially equal number of Q-levels within said initial Q-scale appears both above and below said user-selected selected Q-level on said display device; and displaying on said display device a price and a power rating for each said Q-level, wherein said display incorporates a graphical hierarchy that displays the relative importance of said Q-levels based on the values of the power rating associated with each said Q-level;

by a user, launching said program on said computing system;

by a user, selecting or inputting an initial Q-level placement price;

by a user, selecting or inputting a trading symbol for the security or commodity of interest;

by a user, studying said display of Q-levels relative to said user-specified Q-level placement price and determine what the Q-based target support and resistance levels are, wherein said support level is determined by finding the first Q-level below said Q-level placement price that has a power rating above that of said Q-level placement price, which represents the support level, and wherein said resistance level is determined by finding the first Q-level above said Q-level placement price that has a power rating above that of said Q-level placement price, which represents the resistance level; and by a user, making a buy decision before the price for the security or commodity of interest goes below said support level, and/or making a sell decision before the price for the security or commodity of interest goes above said resistance level.

12. The method of claim 11, wherein said seeding of the system occurs by allowing said user to select or input an initial Q-level placement price.

13. The method of claim 11, wherein said seeding of the system with an initial Q-level placement price occurs independent of user input by causing the system to seed itself using a process selected from the group comprising reading a data stream that comprises a real-time initial price level, reading a data stream that comprises a quasi-real-time initial price level, and programmatically determining the initial price level.

14. The method of claim 11, wherein said at least one program allows a user to customize the display of prices on said display device by providing a decimal-place offset, the method further comprising the step of:

by a user, as necessary to display Q-level prices in a convenient format, inputting said decimal-place offset.

15. The method of claim 11, wherein said at least one program allows a user to customize the display of prices on said display device by providing a zoom function that dynamically alters the visible high-to-low range of prices, and wherein the system recalculates which Q-levels to display, as well dynamically recalculates the power ratings of each displayed Q-level such that each displayed range of Q-levels still reflects the relative importance of each Q-level with respect to said price placement;

the method further comprising the step of:

by a user, as necessary to display said Q-scale in a convenient range, selecting the zoom level to increase or decrease the overall displayed range of Q-levels.

16. The method of claim 11, wherein said graphical hierarchy that displays the relative importance of said Q-levels is accomplished by displaying said associated power rating next to said associated Q-level.

17. The method of claim 16, wherein said graphical hierarchy that displays the relative importance of said Q-levels is further accomplished by increasing the font weight and size of a Q-level as its relative importance increases.

18. The method of claim 11, wherein said graphical hierarchy that displays the relative importance of said Q-levels is accomplished by adding ruler-style gradations to said Q-scale display, wherein the relative importance of said Q-levels is generally proportional to the associated gradation line length.

19. The method of claim 11, wherein said computing system is selected from the group consisting of a personal computer, a mobile phone capable of downloading and running user applications, and an interactive television set connected to the Internet.

20. The method of claim 11, wherein:

said computing system is an Internet web-based application with which said system user interacts using a web-client application via a remote second computing system, and said second computing system can be a personal computer, a web-enabled mobile phone, or an interactive television system with connectivity to the Internet.

* * * * *